(12) United States Patent
Mirek et al.

(10) Patent No.: US 12,317,402 B2
(45) Date of Patent: May 27, 2025

(54) RADIO FREQUENCY INDUCTIVELY COUPLED PLASMA (RF-ICP) TORCH

(71) Applicants: Patrick Michael Mirek, Oakville (CA); Sina Alavi, North York (CA); Javad Mostaghimi, Mississauga (CA)

(72) Inventors: Patrick Michael Mirek, Oakville (CA); Sina Alavi, North York (CA); Javad Mostaghimi, Mississauga (CA)

( * ) Notice: Subject to any disclaimer, the term of this patent is extended or adjusted under 35 U.S.C. 154(b) by 195 days.

(21) Appl. No.: 18/026,620

(22) PCT Filed: Oct. 4, 2021

(86) PCT No.: PCT/CA2021/000088
§ 371 (c)(1),
(2) Date: Mar. 16, 2023

(87) PCT Pub. No.: WO2022/073094
PCT Pub. Date: Apr. 14, 2022

(65) Prior Publication Data
US 2023/0345611 A1    Oct. 26, 2023

(51) Int. Cl.
*H05H 1/28* (2006.01)
*B22F 1/065* (2022.01)
*B22F 9/14* (2006.01)
*C23C 4/134* (2016.01)

(52) U.S. Cl.
CPC ............... *H05H 1/28* (2013.01); *B22F 1/065* (2022.01); *B22F 9/14* (2013.01); *C23C 4/134* (2016.01)

(58) Field of Classification Search
CPC . H05H 1/28; C23C 4/134; B22F 1/065; B22F 9/14
See application file for complete search history.

(56) References Cited

U.S. PATENT DOCUMENTS

2008/0006954 A1*  1/2008  Yubuta ............... C09C 1/407
                                                          425/6
2012/0261390 A1* 10/2012  Boulos ............... H05H 1/30
                                                          219/121.36

* cited by examiner

*Primary Examiner* — Jimmy T Vu
(74) *Attorney, Agent, or Firm* — Nasser Ashgriz; UIPatent Inc.

(57) ABSTRACT

A conical inductively coupled plasma (ICP) torch (100) and a method for processing sample particles is disclosed. In this method raw, unprocessed, irregularly shaped sample particles (21) are injected into the conical torch, and pass through the plasma to form molten particles (22) and a spheroidization of the particles finally generates solid, smooth, spherical and dense processed particles (23) once cooled. The conical torch has a torch tube that has a conical section and an injector tube (2) that has a conical end. The conical section of the torch tube and the injector tube form an annular gap through which outer plasma gas is passed through. This conically exiting outer gas flow results in a rapid rise in gas temperatures and a short plasma region that rapidly melts any particles.

31 Claims, 17 Drawing Sheets

RADIO FREQUENCY INDUCTIVELY COUPLED PLASMA (RF-ICP) TORCH

FIELD OF THE INVENTION

The present invention relates to plasma torches and in particular inductively coupled plasma torches.

BACKGROUND OF THE INVENTION

Inductive plasma torches have established themselves as the tool of choice for ceramic and metallic powder processing and may be used in a variety of applications, such as densification, purification, spheroidization and nanoparticle synthesis. A raw powder is processed by injecting it into the plasma plume, having temperatures exceeding 10,000 kelvin, where powder particles become molten, and surface tension forces cause them to assume dense, spherical shapes. Upon exiting the plasma, the particles re-solidify in-flight and are collected in an adjoining chamber. When these processed particles are used in applications such as thermal coatings or part production, they provide advantages that include increased processing speeds (due to improved powder flowability) and denser, more uniform coatings and parts. The industries which benefit from these processed powders include transportation, which use them to produce wear-resistant and corrosion-resistant coatings, and aerospace and medical, which use them in metal injection molding. Additionally, emerging 3D printing and additive manufacturing techniques such as directed laser metal sintering (DLMS), selective laser melting (SLM), selective electron beam melting (SEBM) and directed energy deposition (DES) depend on the processed powders. All these applications require high powder flowability and high packing efficiency to maximize printing speeds and minimize part porosity. The plasma torches have also been long used in thermal spray of metallic and ceramic coatings, and, more recently, in hybrid plasma spraying, physical vapor deposition (PVD) and chemical vapour deposition (CVD) processes.

The advantages of plasma torches compared to the popular direct current (D.C.) torches are that, due to the lack of electrodes, the plasma is clean and is not contaminated by the electrode material, the plasma has large volume with relatively small temperature gradients, and the plasma velocity and temperature fields are axisymmetric. Importantly, materials are centrally injected into the torch. This feature allows uniform processing of the injected powders or liquids.

Additionally, the plasma torch benefits from the absence of electrodes that wear over time and contaminate the processed powder. Conventional plasma torches consume far more gases and power than required for processing materials. Attempts have been made to address these issues since the inception of plasma torches in the 1960s. These efforts were led by Reed, who in 1961 introduced a double flux design that improved torch flow patterns by using a secondary outer gas flow to create a low-pressure zone inside the torch to stabilize the plasma. The tubular geometry used in this design is still used in modern-day plasma torches. The years which followed included several efforts with partial success that focused on varying torch geometry, implementing water cooling, using multiple coils, optimizing operating parameters and adjusting torch size.

Although these efforts have reduced gas and power consumption and improved particle flow patterns in plasma torches, there has been limited success in varying torch geometry to address these issues. The conventional designs do not greatly improve the yield of processed particles and have a high operating cost. Thus, there is a need for a radio-frequency inductively coupled plasma torch (RF-ICP) with unique geometry, which eliminates the existing shortcomings of the current state-of-the-art plasma torches.

SUMMARY OF THE INVENTION

A radio-frequency inductively coupled plasma (RF-ICP) torch is disclosed in an example embodiment of the present subject matter. The RF-ICP torch comprises a tubular component to process sample particles. The tubular component comprises a first cylindrical tube portion at the first end of the tubular component. The tubular component also comprises a conical tube portion at a second end of the tubular component and coupled to the first cylindrical tube portion. The conical tube portion is coupled to the first cylindrical tube portion such that a smaller diameter end of the conical tube portion is coupled to the first cylindrical tube portion and the conical tube portion is to output processed sample particles.

The RF-ICP torch further comprises an injector tube. The injector tube comprises a posterior end concentrically placed inside the tubular component. The posterior end of the injector tube also comprises an outlet to deliver a plasma gas and the sample particles into the conical tube portion of the tubular component. The posterior end is concentrically placed inside the conical tube portion such that the posterior end does not touch the inner walls of the tubular component. The injector tube also comprises an anterior end that lies outside the first end of the tubular component. The injector tube also comprises an inlet to input the plasma gas and sample particles to be delivered by the outlet into the conical tube portion. Furthermore, a load coil is wound on an outer surface of the tubular component to energize the plasma gas in the tubular component.

In operation, plasma gas and sample particle are delivered via the injector tube into the conical tube portion. The plasma gas is energized by passing an electric current through the load coil. Energized plasma gas creates a plasma plume which processes the sample particles and the sample particles are outputted from the conical tube portion.

The outputted sample particles may be used in various applications, such as powder processing, thermal spraying, nano-powder synthesis, and waste treatment, material processing, crystal growth, spectrochemical analysis, cladding in the fiber optics industry, X-ray target manufacturing, 3D printing, and additive manufacturing.

The RF-ICP torch of the present subject matter has narrowed upstream section due to the presence of conical tube portion. This improves plasma gas injection into the conical tube portion. This feature reduces plasma gas consumption and achieves higher temperatures with less amount of plasma gas. High temperature plasma leads to high velocities of processed sample particles which improves the output yield of processed sample particles. Thus, the RF-ICP torch of the present subject matter has a higher efficiency and increased processed sample particle yield as compared to state-of-the art plasma torches. The RF-ICP torch of the present subject matter provides increased productivity with lower plasma gas consumption and lower power consumption.

Figure 1:
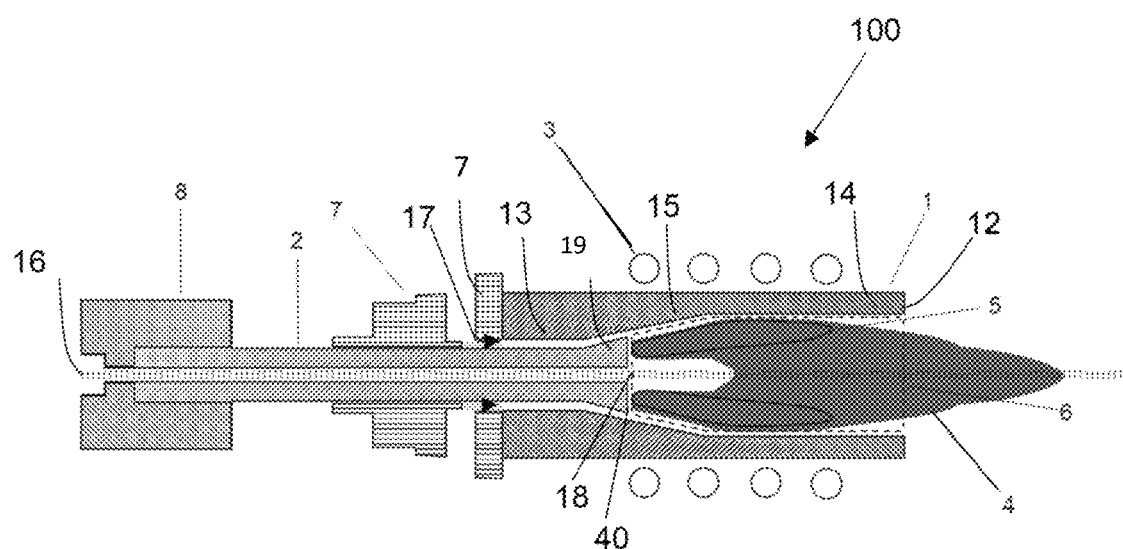
FIG. 1 illustrates a radio-frequency inductively coupled plasma (RF-ICP) torch according to an example implementation of the present subject matter.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

For simplicity and illustrative purposes, the present disclosure is described by referring mainly to examples thereof. The examples of the present disclosure described herein may be used together in different combinations. In the following description, details are set forth in order to provide an understanding of the present disclosure. However, it will be readily apparent that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on, the term "based upon" means based at least in part upon, and the term "such as" means such as but not limited to.

Figure 2A:
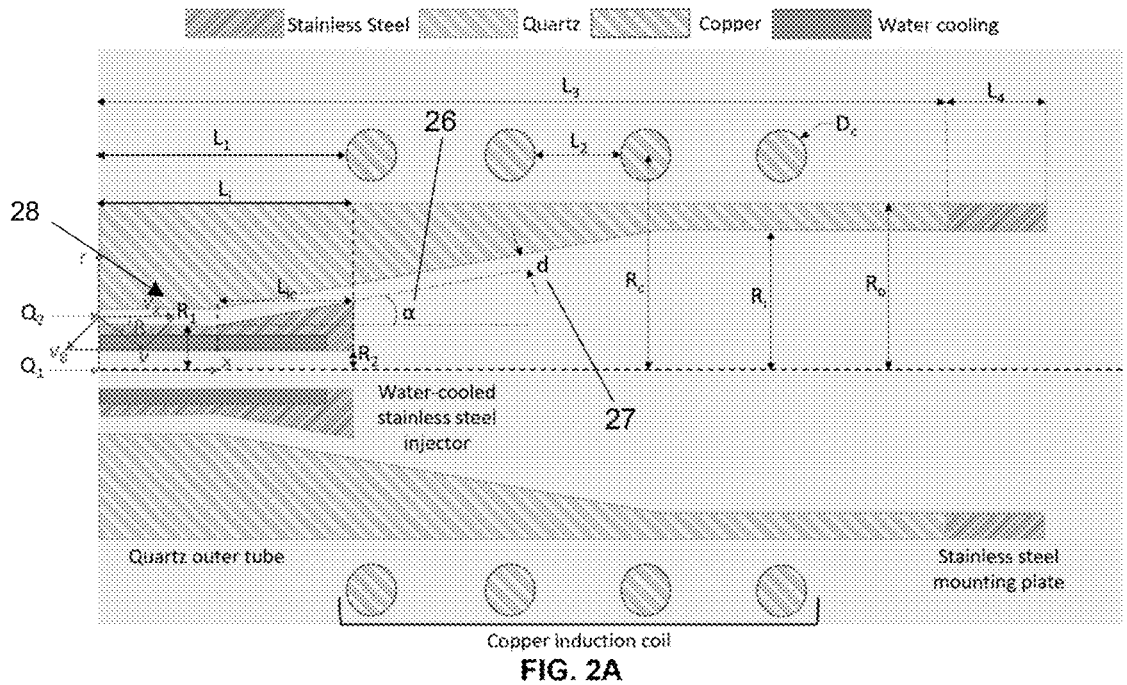
FIG. 2A illustrates the front portion of the present conical torch.
Figure 2B:
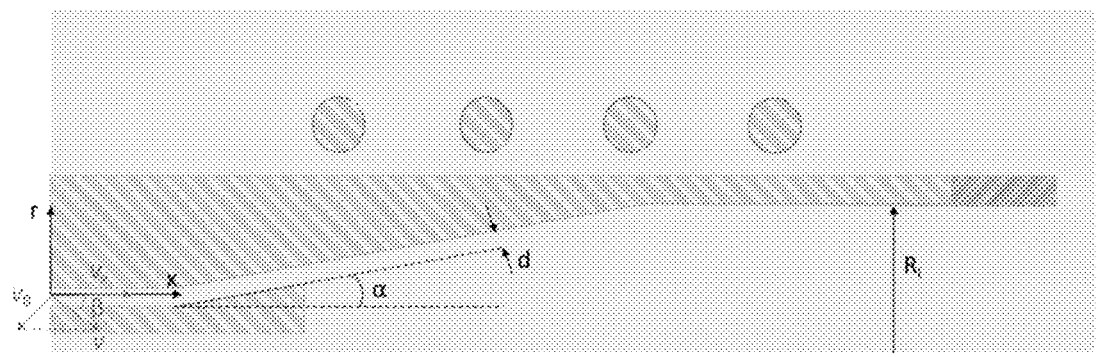
FIG. 2B illustrates the cone angle and the gap of the present conical torch.

FIGS. 1, 2A, 2B, and 3 illustrate a radio-frequency inductively coupled plasma (RF-ICP) torch 100 according to an example implementation of the present subject matter. The conical torch comprises of a torch tube (1) having a first end (11) and a second end (12). The torch tube has a first cylindrical section (13) starting from the first end (11), which then expands conically (15) to connect to a second cylindrical section (14). The radius of the second cylindrical section is defined as $R_i$. Accelerated gas velocity in the flow path: between 10-100 m/s, between 20-60 m/s, around 40 m/s The conical torch of the present invention has an injector tube (2) for the injection of carrier gas into the torch. The inner diameter of the injection tube forms a carrier flow path (16). The distal end (19) of the injection tube (2) is conical and defined by a cone angle $\alpha$ (26). The conical end of the injector tube is configured to match the conical section of the torch tube to form an annular gap with a gap size, d (27). An outer flow is injected into the outer gas flow path (17). The conical end of the injection tube and the conical section of the torch tube are configured to increase the outer gas velocity. Accelerated gas velocity in the flow path can be in the range of 10 to 100 m/s, and ideally between 20-60 m/s, and optimally around 40 m/s. High outer gas flow velocities provide better cooling of the torch even with low overall inlet gas flow rates. This prevents thermal damage to the torch components and saves gas, and therefore, reduces operation costs. The plasma gas and the sample particles are delivered from the gas flow path 16 of the injector tube 2. The injector tube 2 is concentrically placed inside the torch tube 1 such that posterior end of the injector tube 2 does not touch inner walls of the tubular component of the torch tube 1 and there is a gap between the injector tube 2 and the tubular component as shown in FIGS. 2A and 2B. The present conical torch, 100 has two flow paths. One for a carrier gas entering at 16, into the injector tube and one for an outer gas flow, entering at 17 into the torch tube 1. The prior art torches have three gas inlets.

Referring to FIGS. 2A and 2B: The plasma gas may be introduced into the tubular component 1 in a swirling manner from the outer gas flow path 17. The angle of the swirl of the gas can be denoted by $\beta$. Swirl angle ($\beta$) can be between 0° to 90°, preferably between 0-45°. The optimized value is 22.5°. Parameter ($\alpha$) is a cone angle of the tubular component as shown in the FIG. 2A. The value of $\alpha$ can be between 5°-45°, preferably between 7.5°-17.5°. The optimized value is 10°. Parameter d is a gap between the injector tube 2 and inner walls of the tubular component 1. The parameter d can be between 0.5-3 mm, preferably between 1-2.5 mm. The optimized value is 1.5 mm. Parameter $R_i$ represents radius of the second cylindrical tube portion. The value of $R_i$ 28 can be between 8-20 mm, preferably between 13-17 mm. The optimized value is 13.8 (~14) mm.

A load coil (3) is provided around the outer surface of the torch tube 1 to generate an inductively coupled plasma (ICP) (4), which has an induction zone (5). The energy induced by the load coil forms a plasma in the torch cavity (6). A distal injector fixture (7) and a proximal injector fixture (8) are used to hold the injector tube and position it concentrically within the torch tube and within the load coil. In one embodiment, in order to collect particles, a collection chamber (25) can be connected to the conical torch by a mounting plate (24) to collect processed particles. The present conical torch provides high plasma temperatures within an induction zone that is closer to a central axis of the conical torch in comparison with conventional torches.

In an example, the torch tube 1 and the injector tube 2 may be made up of dielectric materials, such as quartz, alumina, boron nitride, silicon nitride, silicon carbide, zirconia, yttria, ceria, beryllium oxide. In another example, the tubular component 1 and the injector tube 2 may be made up of stainless steel.

In operation, a plasma gas and sample particles are injected into the torch tube 1 via the injector tube 2. In an example, the sample particles may be in powder form, such as metal powders, ceramic powders etc. In another example, the sample particles may be small pieces of metals, particle suspended in a liquid etc. In an example, the plasma gas may be one of helium, argon, oxygen, hydrogen, nitrogen, air, or a mixture of these and other gases.

The plasma gas and the sample particles are injected into the gas flow path 16 of the injector tube 2. The plasma gas and the sample particles are subsequently delivered in the torch tube 1 by the outlet 18 of the injector tube 2. A load coil 3 is wound around the torch tube 1 to energize the plasma gas. In operation, the RF inductively coupled torch is held upstream using a torch holder so that the torch tube can be positioned within the load coil 3. Further, the plasma gas in the conical tube portion is energized by passing radio frequency alternating electric current through the load coil 3 which heats up the plasma gas in the conical tube portion to generate an Inductively coupled plasma, ICP (of the conical torch), 4, with an Induction zone (of the conical torch), 5, where all the energy is induced from the load coil into the plasma. The plasma is formed in the torch cavity, 6.

Figure 3:
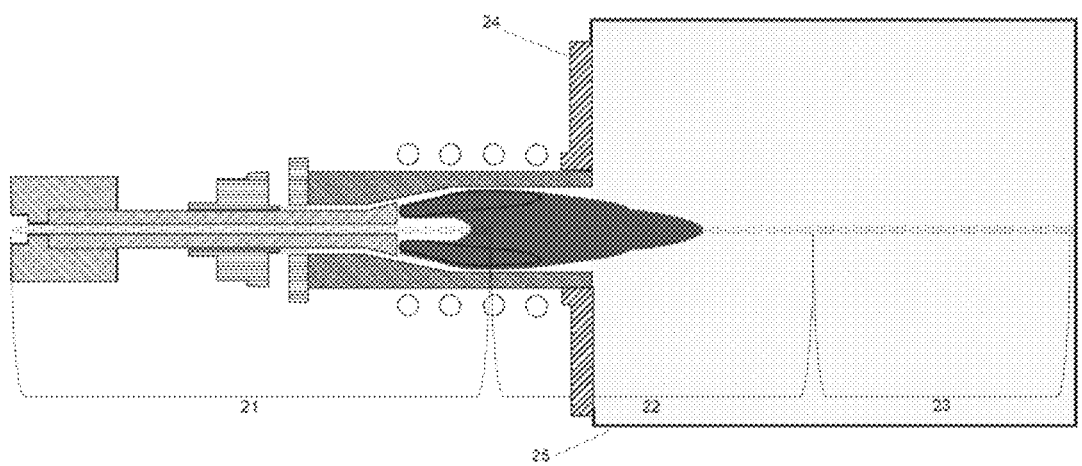
FIG. 3 illustrates the present conical torch and a collection chamber for the collection of the particles generated by the present system.

The plasma plume 4 heats up the sample particles and the samples particles are molten. The molten sample particles cool and solidify in flight just after existing the plasma plume. These solidified sample particles assume a smooth uniform spherical shape and are called as processed sample particles. Thus, the processed sample particles are outputted from the conical tube portion. FIG. 3 shows the operation of the present torch, wherein raw, unprocessed, irregularly shaped particles (21) are injected into the conical torch, and pass through the plasma to form molten particles (22) and processed particles in the form of solid, smooth, spherical and dense particles (23) are generated and collected in the collector. FIG. 3 also shows the Mounting plate, 24, and Collection chamber, 25, for this application.

The sample particles are processed to produce smooth, dense, spherical powdered samples particles from rough, porous, irregularly shaped sample particles. Due to the high temperatures of the plasma plume 4 (typically more than 10,000 Kelvin), the sample particles are melted and processed. A wide range of material, such as metals, ceramics can be processed using the RF-ICP torch of the present subject matter. The processed sample particles have advantages, such as improved flowability, consistent texture, and consistent sizes of particles. Thus, the processed sample particles enable a faster and more consistent rate of sample particle delivery in applications such as the spraying of thermal barrier coatings and various other industrial uses. Further, the processed particles ensure higher packing efficiency which results in resulting in higher quality end products.

Further, due to high temperature achieved in the RF-ICP torch of the present subject matter, sample particles having higher melting points can be processed in the RF-ICP torch of the present subject matter. Further, due to smaller diameter at one end of the conical tube portion, the induction zone 5 is created closer to the sample particles resulting in efficient processing of the sample particles.

In an example, there may be two gas paths through which the plasma gas may be introduced into the tubular component 1. A first inner gas flow path 16 may be used to introduce the plasma gas through the inlet of the injector tube 2. It should be noted that the sample particles are also introduced through the first inner gas flow path 16. Further, an outer gas flow path 17 may also be created between the injector tube 2 and the tubular component 1. The plasma gas may also be introduced through the outer gas flow path 17 created between the injector tube 2 and the torch tube 1. The injector tube 2 has a flared portion 40 that coincides with the conical portion of the torch tube. The flared portion 40 prevents the plasma gas from directly going into the plasma plume 4 which would otherwise extinguish the plasma plume 4.

Figure 4A:
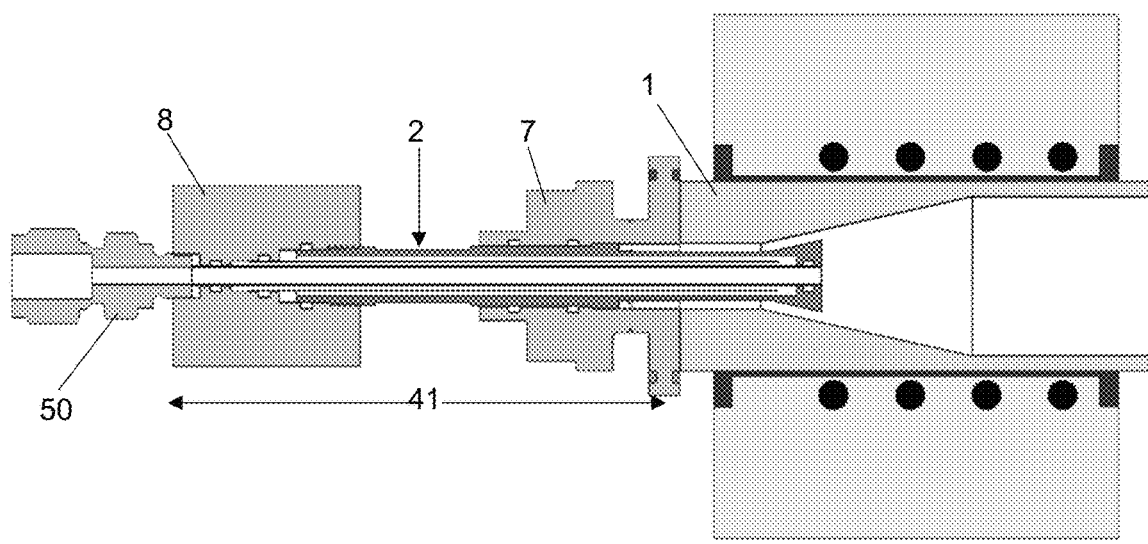
FIG. 4A illustrates the cross sectional view of the present conical torch.
Figure 4B:
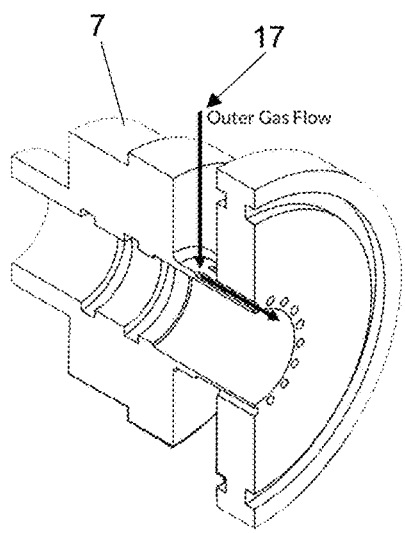
FIG. 4B illustrates one embodiment of the conical torch with an axially injected outer gas flow configuration.
Figure 4C:
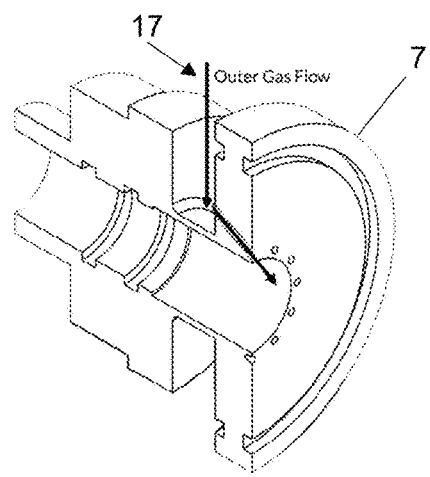
FIG. 4C illustrates another embodiment of the conical torch with a tangentially injected outer gas flow configuration.

FIGS. 4A and 4B show the configurations of the distal injector fixture 7, which allow for the outer gas from the outer gas flow path 17 to be injected either purely axially as shown in FIG. 4B or with a tangential component (i.e., swirl generator) as shown in FIG. 4C. FIGS. 4B and 4C show the configurations of the conical torch with an axially injected outer gas flow or a tangentially injected outer gas flow. The swirl component causes the injected particles to spread radially (away from the central axis) and travel closer to the induction zone. Therefore, the particles are exposed to much higher temperatures and melt faster. The swirl velocity is optimized by adjusting the outer gas swirl angle ($\beta$). The axial flow of the plasma gas results in less radial spreading of processed sample particles and consequently a narrower particle size distribution, which is favorable in some application. However, this also increases the concentration of particles which travel along the central axis of the torch, thereby decreasing the temperature of the plasma plume.

The swirling flow of the plasma gas results in some radial spreading which results in a wider particle size distribution but improves the temperature of the plasma plume. The axial or swirling manner introduction of the plasma gas may be used based on the application and usage of the RF-ICP torch.

Figure 5A:
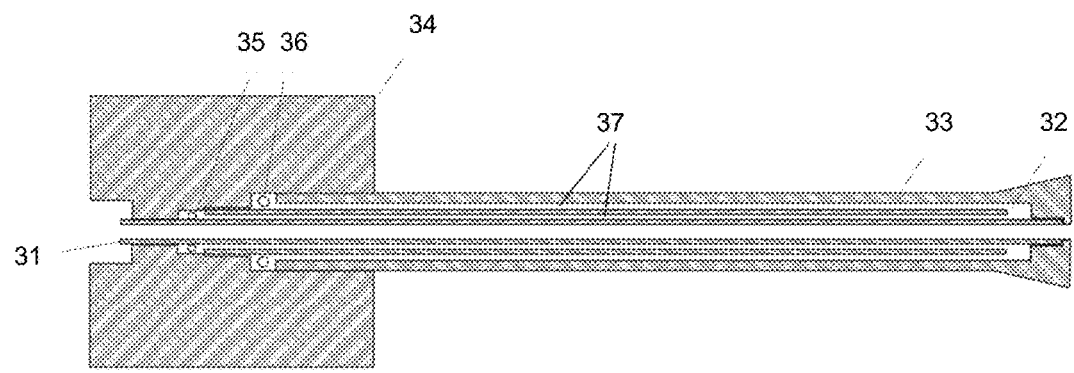
FIG. 5A illustrates the injector tube of the present conical torch with a cooling system.
Figure 5B:
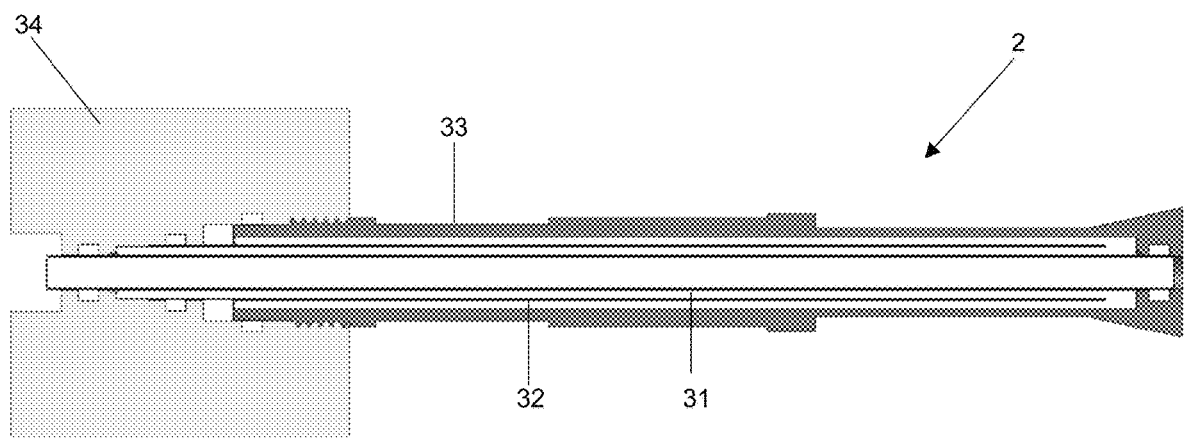
FIG. 5B illustrates the cooling fluid flow path in the injector tube.
Figure 6:
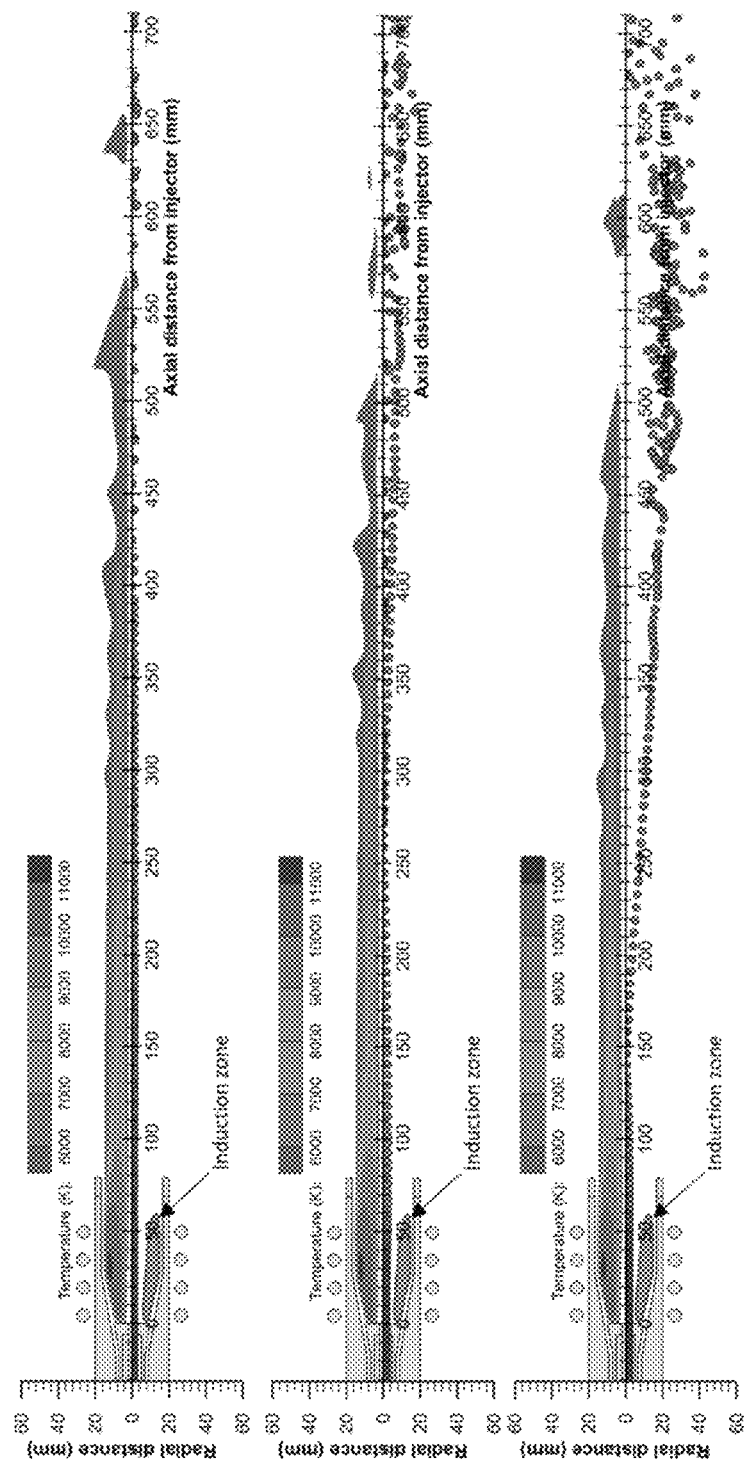
FIG. 6 shows particle trajectories, temperature contour and induction zone for (top) $\beta=0°$, (middle) $\beta=22.5°$, and (bottom) $\beta=45°$.

FIGS. 5A and 5B show the Injector tube 2 for conical torch to provide fluid cooling, which shows the Inner tube of the Injector, 31, the Intermediate tube of Injector, 32, the Outer tube of Injector, 33, the Proximal injector fixture, 34, the Cooling fluid inlet 35, the Cooling fluid outlet, 36 and coolant channels 37. The presently disclosed injector tube is internally cooled, FIG. 5B, (e.g., with water or any other coolants), so that it can be inserted deep into the plasma without being thermally damaged. Therefore, the powder particles can be injected directly inside the plasma, rather than behind it, for better productivity. The outer tube can also be externally cooled (e.g., with water, air, or other coolants). This, in combination with the conical design of the torch, decreases the amount of Outer gas required to operate the torch without thermal damage. As a coolant is used for maintaining the temperature of the injector tube 2, the injector tube may be inserted deep inside the plasma plume 4 formed and thus, the sample particles can be directly delivered in the plasma plume 4 increasing the yield of the processed sample particles. The conical tubular design of RF-ICP torch also decreases the amount of plasma gas required to operate the torch without having thermal damage. FIG. 6B shows the cooling fluid flow path in the Injector.

Referring to FIG. 4A again in operation of the present radio-frequency inductively coupled plasma (RF-ICP) torch, a plasma gas and sample particles are injected into the injector tube 2 at the carrier gas and power adaptor 50, and flow through the length 41 of the injector tube and are carried to the torch tube 1. The plasma gas and sample particles are injected using an injector tube of the RF-ICP torch. In an example, the plasma gas may be many different gases, such as helium, argon, oxygen, hydrogen, nitrogen, air, or a mixture of these gases. In an example, the sample particle may be provided in powder form. Further, as explained earlier, the plasma gas may also be introduced through an outer gas flow path 17 created between the injector tube 2 and the tubular component of the torch tube 1. The advantages of additional injection of plasma gas have been explained with reference to further figures. The plasma gas injected into the torch tube is energized by passing radio frequency alternating current through load coils wound around the conical tube portion of the RF-ICP torch. Energization of the plasma creates a plasma plume and induction zone in the conical tube portion of the RF-ICP torch. The high temperatures of the plasma formed melts the sample particle and consequently the sample particle are processed. Processed sample particle is outputted from the torch tube. In an example, the processed sample particles are collected in an adjoining collection chamber. The processed sample particle may be used for various industrial applications.

In another example, the processed sample particle may be deposited on a substrate placed in front of the RF-ICP torch to thermally coat the substrate with the processed sample particle.

Detailed Operation Data

The range of parameters used in the RF-ICP torch of the present subject matter: The power in the load coil 3 can be maintained between 5 kW to 250 kW, preferably between 20-50 kW, more precisely between 25-45 kW. Oscillation frequency (i.e., radio- or microwave frequency) of the alternating current in the load coil 3 can be between 400 kHz to 100 MHz, preferably between 3 MHz to 40 MHz. The pressure can be between atmospheric pressure (1 bar) to partial vacuum. The plasma gas flow rate through the outer gas flow path 17 can be between 20-150 litres/minutes (L/min), preferably between 50-100 L/min. For a RF inductively coupled torch operating at 45 kW, the optimum value is 85 L/min.

The RF-ICP torch 100 was optimized by following a single parameter optimization procedure for the parameters $\beta$, $\alpha$, d, and $R_i$, in that order (see FIG. 2A). The optimization criteria used in this process was the particle spheroidization ratio, which is the ratio of spheroidized to total sample particles. Once particles become fully molten, they become spherical. This ratio was measured at 50 mm intervals from the injector exit, up to a total distance of 700 mm. Additionally, the RF ICP outer wall's temperature was monitored so that it did not exceed 1000 K. This temperature limit was chosen based on the solid phase stability threshold for fused silica quartz of 1143 K, where 1000 K provided a margin of safety.

Titanium carbide was chosen as the sample particle due to its high specific heat capacity and latent heat of melting relative to commonly processed materials, which would test the limits of the torch.

Figure 7:
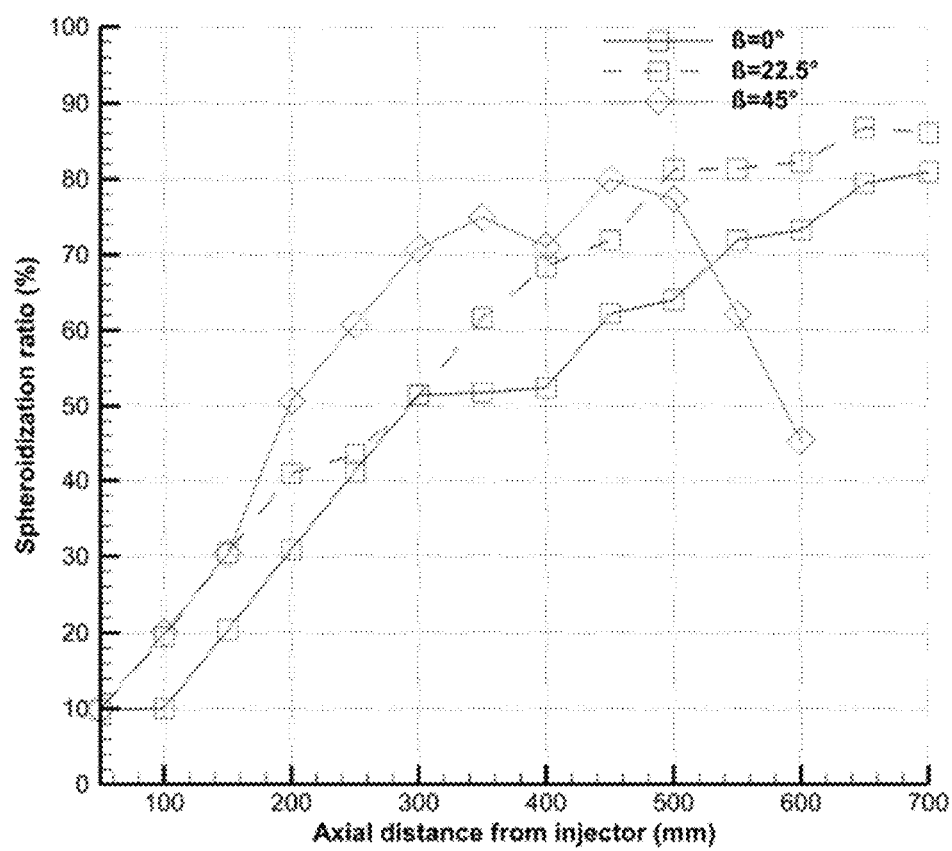
FIG. 7 illustrates spheroidization ratios of the particles with distance from a injector tube of the RF-ICP exit for varying $\beta$.
Figure 8:
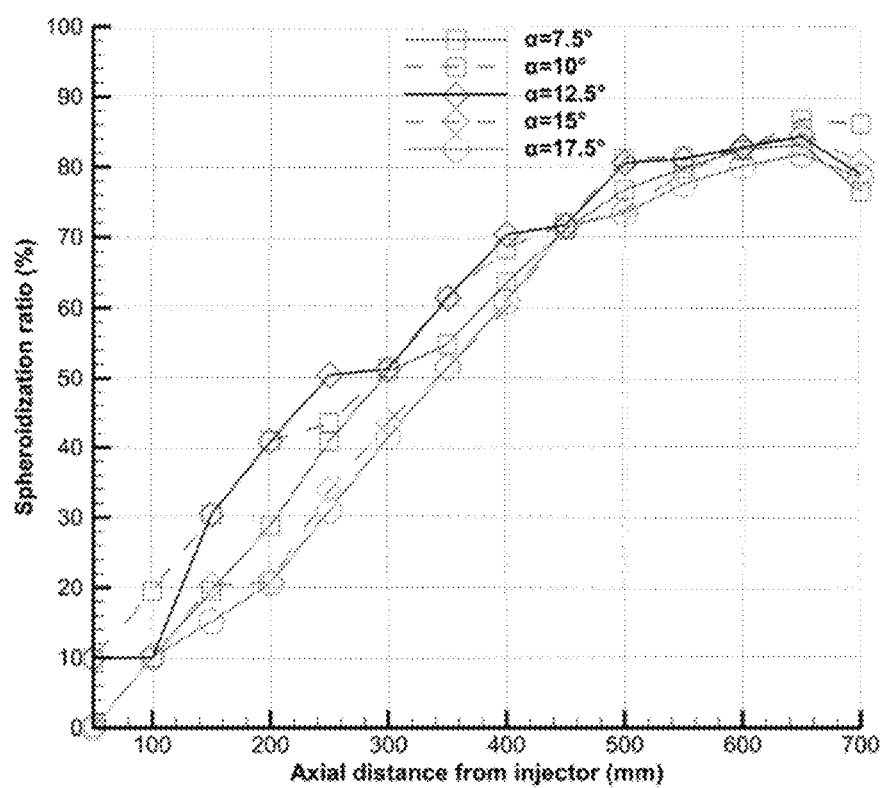
FIG. 8 illustrates spheroidization ratios of the particles with distance from injector tube outlet for varying $\alpha$.

The optimization begins with parameter $\beta$, which was varied from 0-45° while parameters $\alpha$, d, and $R_i$ were held fixed at 10°, 2 mm, and 16.8 mm, respectively. It was found that a value of 45° caused significant radial spreading in the processed sample particles due to centrifugal forces generated by the plasma gas introduced through the outer gas flow path 17. This causes particles to prematurely exit the plasma and not experience complete melting, resulting in lower spheroidization ratios (see FIG. 7). Conversely, a value of 0° results in mainly axial trajectories of powder particles. This concentrates particles along the central axis, which creates a significant thermal loading effect on the plasma. The result is less heat transfer to sample particles, particularly those closest to the central axis, which are being shielded from the plasma by surrounding particles. A value of 22.5° was found to provide a balance where particles experienced a moderate degree of radial spreading, which reduced thermal loading, while keeping sample particles within the plasma for its entire length. Additionally, since the hottest parts of the plasma (i.e., the induction zone) are offset from the central axis, some spreading of particles is beneficial in that it brings particles closer to these regions. Next, parameter $\alpha$ was varied from 7.5-17.5° (as show in FIG. 8). It was found that higher values of $\alpha$ resulted in circulations developing inside the RF-ICP torch due to the larger radial component of the plasma gas introduced through the outer gas flow path. The plasma gas introduced through the outer gas flow path 17, with its high momentum, pulls the plasma gas introduced from inner gas flow path 16 into the direction it is traveling. When particles are small or have a low Stokes number, they can get caught in these circulations, experience unpredictable heating/cooling and deposit on the walls of the adjoining collection chamber. Note that this was not the case for the sample particles modeled, since they had a sufficiently large stokes number, however this is a possible phenomenon in processing of sample particles. Conversely, lower values of $\alpha$ resulted in greater flow instabilities due to a higher axial velocity component. This can cause the plasma to become unstable and produce off-center particle trajectories. As a result, a value of 10° was chosen as it provides the optimum balance between these effects.

Figure 9:
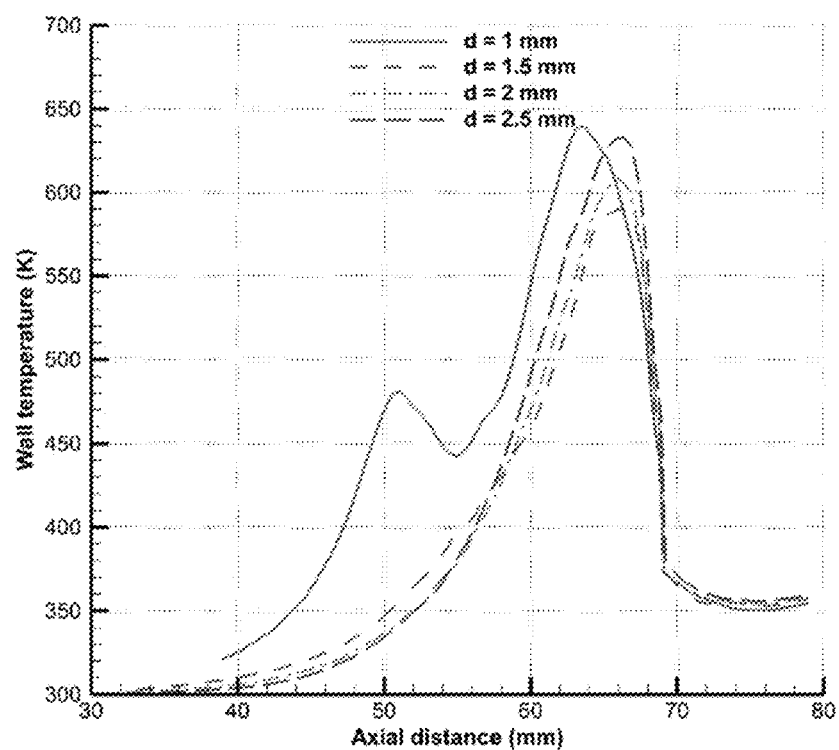
FIG. 9 illustrates the temperature profile along outer wall with distance from start of domain for varying d (85 L/min outer gas flow rate).

Next, parameter d was varied from 1-2.5 mm. It was found that parameter d did not have a significant impact on spheroidization ratios, but more so on the temperature of walls of RF-ICP 100, since it determines the thickness and velocity of the plasma gas introduced through the outer gas flow path 17. It was found that lower values of d, while producing a higher velocity flow which provided greater convective cooling to the outer wall of the RF-ICP torch 100, also decreased the thickness of the layer of plasma gas introduced through the outer gas flow path. A thinner layer of plasma gas allows the plasma to get closer to the outer wall of RF-ICP torch 100 and increases the amount of heat transferred to it. Additionally, it was found that smaller values of d resulted in flow instabilities due to the higher velocity flow, so this was taken into consideration. A value of 1.5 mm provided the optimum balance between these trade-offs by minimizing torch wall temperature and flow instabilities as show in FIG. 9.

Figure 10:
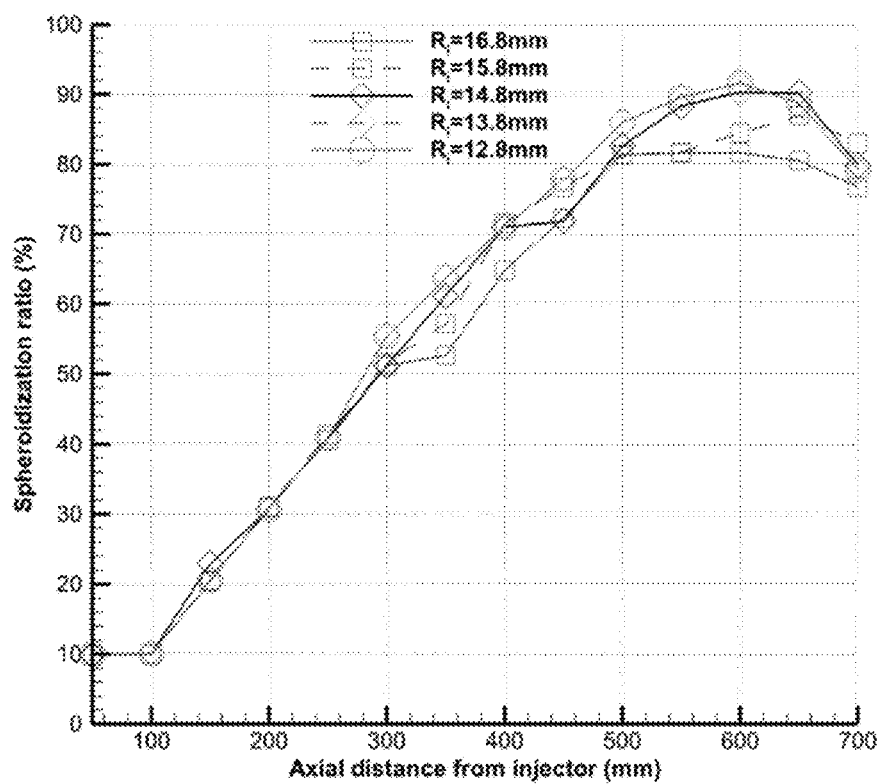
FIG. 10 illustrates the spheroidization ratios of the particles with distance from injector tube outlet for varying $R_i$.

Finally, parameter $R_i$ was varied from 12.8-16.8 mm. It was found that a smaller $R_i$, which reduces the internal volume for the RF-ICPtorch, also causes an increase in velocity and temperature due to a more concentrated plasma. This increases the heat transfer to particles, boosting spheroidization ratios as show in FIG. 10. Although the higher temperatures increase the particle velocity due to gas expansion and greater Lorentz forces, thereby decreasing particle residence time in the plasma, it was found that the higher temperatures outweigh this effect, as is evident by the increasing spheroidization ratios with decreasing $R_i$ shown in FIG. 10.

However, $R_i$ cannot be decreased indefinitely, as doing so would increase the temperature of walls of RF-ICP torch 5 beyond the set limit of 1000 K. Increasing the flow rate of plasma gas introduced through the outer gas flow path 17, to combat is not desired since a goal of this design is to reduce gas consumption. An $R_i$ of 13.8 mm was found to be the minimum value that prevented the wall temperature from exceeding the temperature limit.

The optimization procedure yielded values of 22.5°, 10°, 1.5 mm and 13.8 mm for parameters β, α, d, and $R_i$, respectively.

Figure 11:
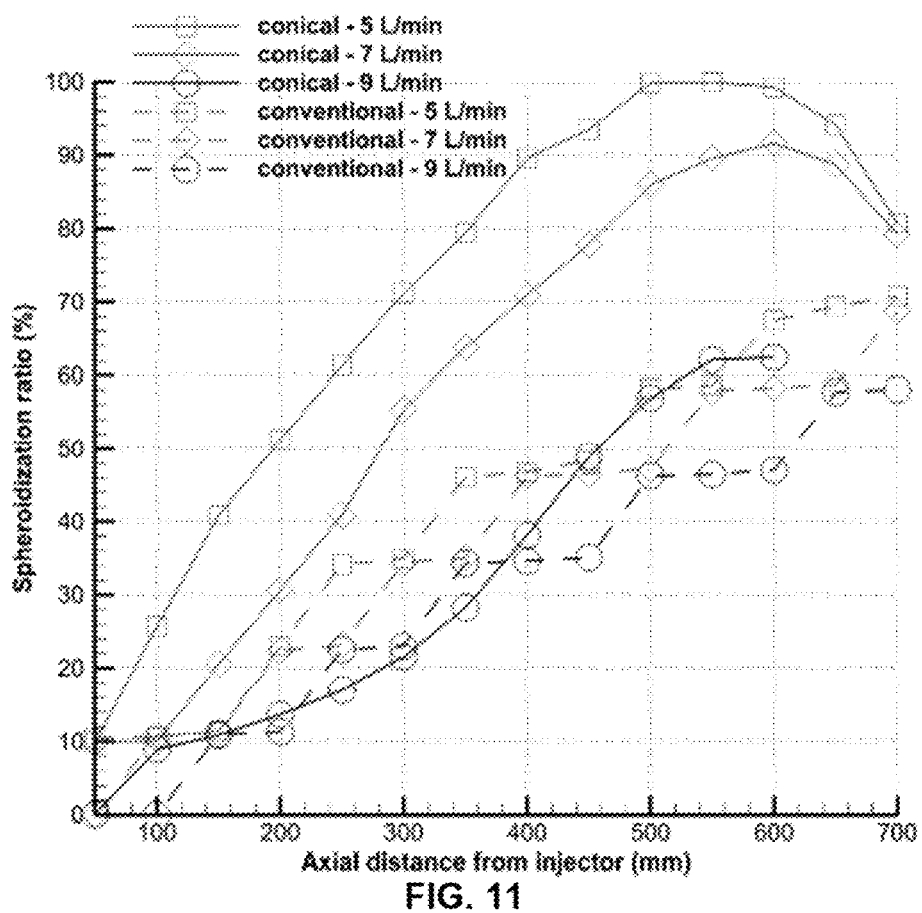
FIG. 11 illustrates variation of the spheroidization ratios of the particles with carrier gas flow rates for the present RF-ICP conical torch and a conventional torch both with 45 kW torch power and 20 g/min particle feed rate.

The performance of the present conical RF-ICP torch was compared to a conventional industrial scale plasma torch of a similar power level, specifically the conventional plasma torch named, Tekna PL-50. This conventional torch typically operates at flow rates of 120 L/min for the outer gas and 30 L/min for the intermediate gas (45° swirl angle). For both the present conical RF-ICP torch and the conventional torch, the plasma gas flow rate was varied between 5-9 L/min while the sample particle feed rate and power were held at 20 g/min and 45 kW, respectively. The present torch outperformed the conventional torch at all flow rates, particularly at lower ones, as seen in FIG. 11. The smaller internal diameter of the tubular component 1 of the conical torch 100 (32 mm for the conical torch 100 versus 50 mm for the conventional torch) increases the plasma temperature (11500 K for the conical torch 100 vs. 10500 K for the conventional torch) in the induction zone due to a 2.8 times higher power density. Power density of plasma are between 500-13000 W/cm³, ideally between 1000-5000 W/cm³, and optimally around 2200 W/cm³. The power density of a conventional torches are around 0.80 W/mm³). The smaller size of internal diameter of the conical torch brings the induction zone closer to the central axis where most sample particles travel, resulting in a higher degree of heat transfer to particles. These effects cause the spheroidization ratios for the conical torch to rise significantly faster than those of the conventional torch, a benefit which can lead to a smaller overall conical torch 100 system.

The overall length of the plasma in the conical torch 100 is made shorter (i.e., ~540 mm for the conical torch 100 versus ~750 mm for the conventional plasma torch) due to the more concentrated plasma and fewer coil turns. Additionally, as mentioned previously when optimizing parameter β, the swirling flow present in the conical torch produces some radial spreading of sample particle which causes them to enter the hotter parts of the plasma while also decreasing the thermal loading effect. However, the spreading of particles can also result in a wider particle size distribution of the end product collected in the collection chamber due to more variability in the heat transferred to particles. The spreading is proportional to the outer gas swirl velocity angle β, so if desired β can be tuned to eliminate this.

Figure 12:
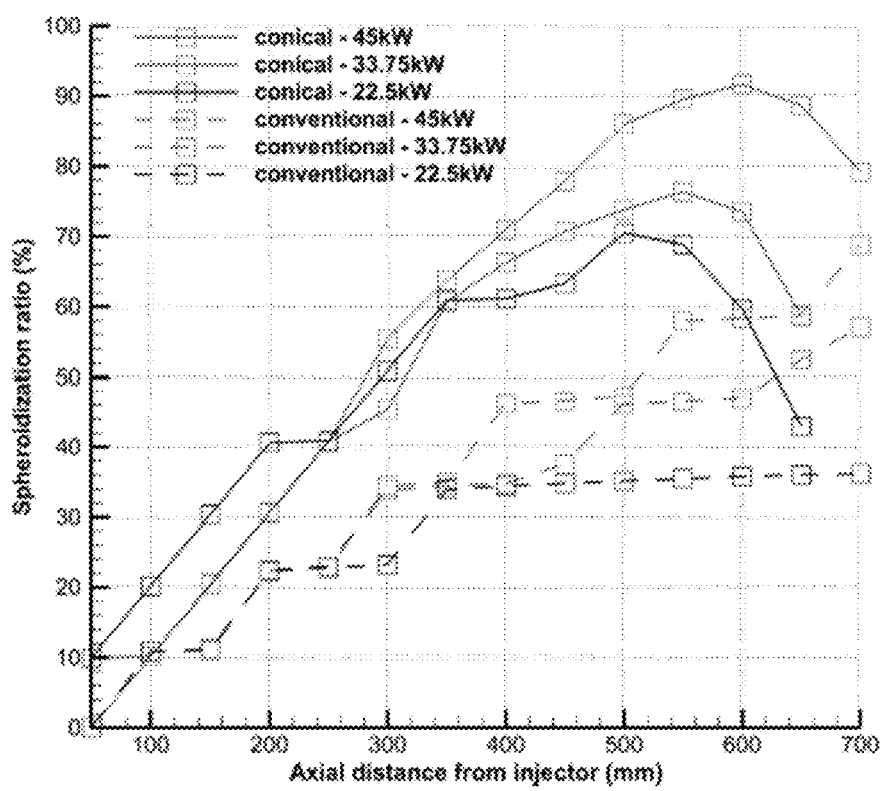
FIG. 12 illustrates example variation of the spheroidization ratios with torch power for the RF-ICP torch and conventional torch (20 g/min particle feed rate, 7 L/min carrier gas flow rate).

For both the conical torch and the conventional torch, the torch power was varied between 22.5-45 kW while the sample particle feed rate and plasma gas flow rate were held at 20 g/min and 7 L/min, respectively. The conical torch was found to outperform the conventional torch at all power levels as show in FIG. 12. Specifically, at 22.5 kW where the plasma lengths for the conical torch and the conventional torch are about equal, the conical torch achieved about a 2-times higher maximum spheroidization ratio (70% for the conical torch versus 36% for the conventional torch). Furthermore, these results show that the conical torch can achieve industrially acceptable spheroidization ratios (i.e. >70%) even at lower power levels, leading to significant energy savings.

Figure 13:
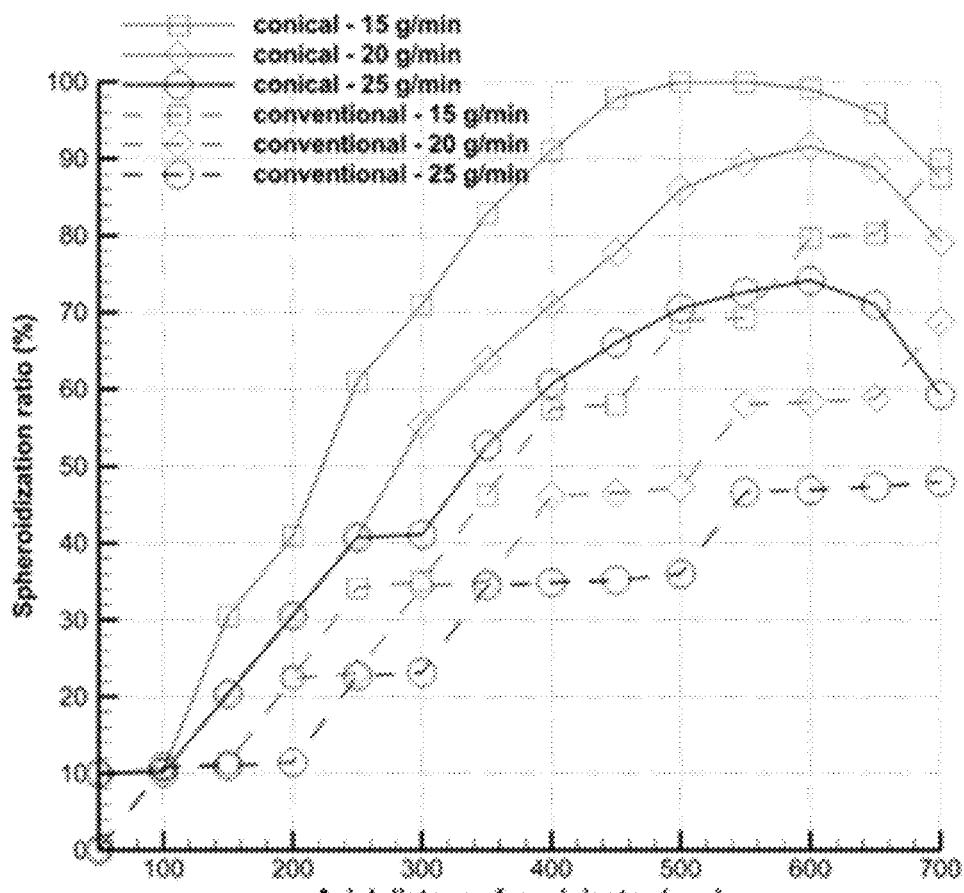
FIG. 13 illustrates variation of the spheroidization ratios with particle feed rate for the RF-ICP torch and conventional torch (45 kW torch power, 7 L/min carrier gas flow rate).
Figure 14:
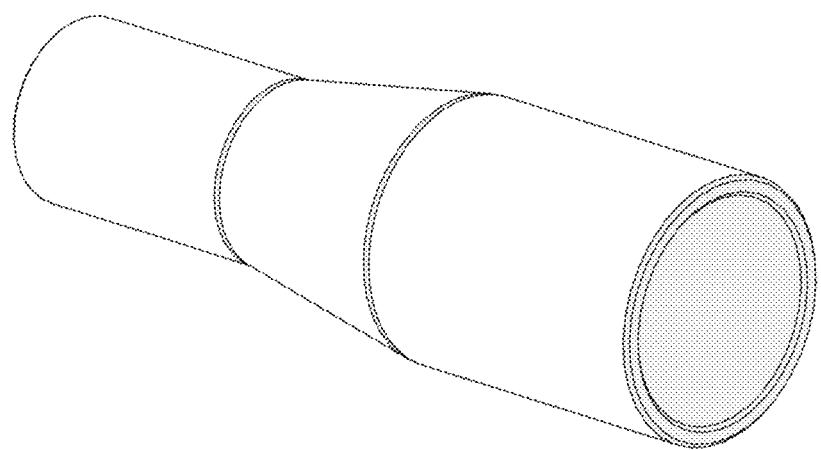
FIG. 14 illustrates the conical outer tube made from silicon nitride.
Figure 15:
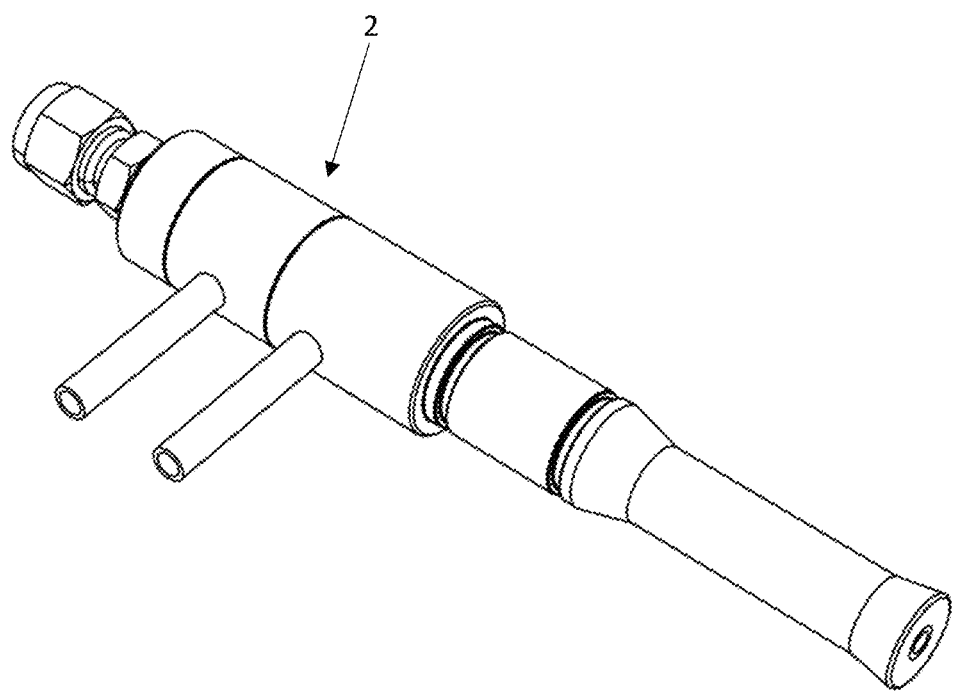
FIG. 15 illustrates an embodiment of the injector tube with two ports for water cooling and one port for sample introduction.
Figure 16:
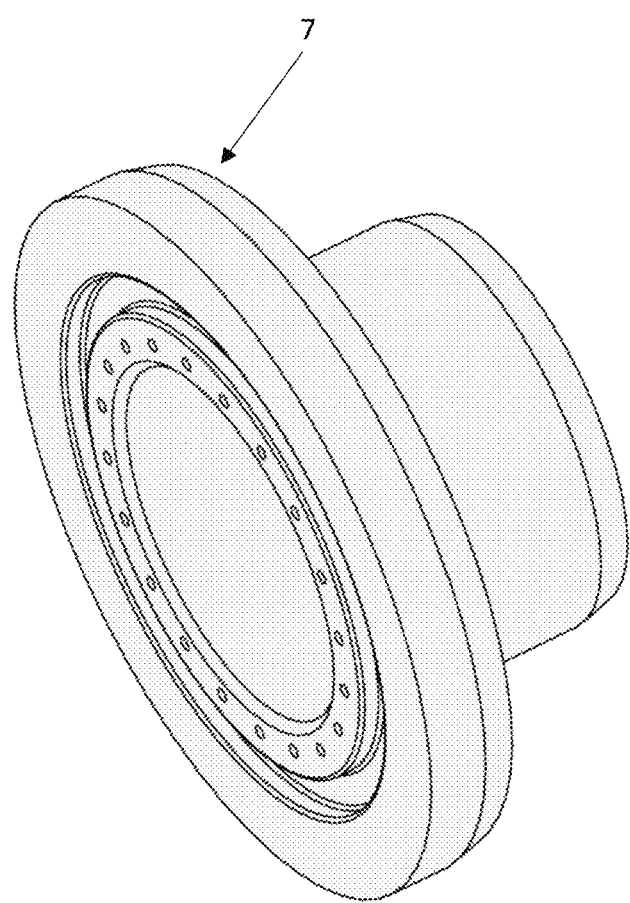
FIG. 16 illustrates a swirl generator.
Figure 17:
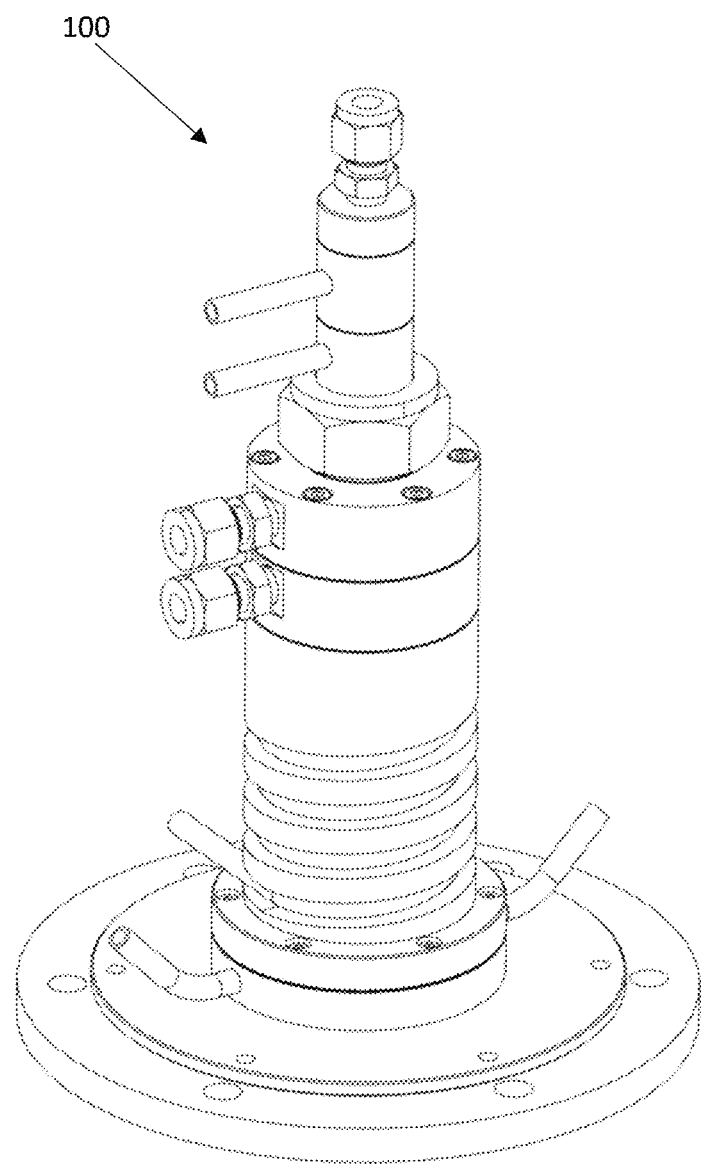
FIG. 17 illustrates an assemble torch.

For both the conical torch and the conventional torch, the sample particle feed rate was varied between 15-25 g/min while the power and carrier gas flow rate were held at 45 kW and 7 L/min, respectively. The conical torch was found to outperform the conventional torch at all feed rates as show in FIG. 13. Furthermore, these results show that the conical torch can achieve industrially acceptable spheroidization ratios (i.e., >70%) even at higher feed rates, leading to higher particle processing rates.

Another point of comparison between RF-ICP torch 100 and the conventional torch is the gas consumption, specifically when argon is used as the plasma gas. The conical torch operates at a plasma gas flow rate of 85 L/min (from outer gas flow path) while the conventional torch operates at 120 L/min. Furthermore, the conical torch does not have an intermediate gas flow, which consumes 30 L/min for the conventional torch. The net result is 42% in gas savings for the conical torch.

FIGS. 14-17 show images of different parts of one embodiment of the present torch that is build and tested.

In summary, the present conical torch can produce a higher quantity of processed particles (i.e. higher spheroidization ratios) at a faster rate while operating with lower gas and energy consumption.

What has been described and illustrated herein are examples of the present disclosure along with some of its variations. The terms, descriptions and figures used herein are set forth via illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A conical inductively coupled plasma (ICP) torch for processing sample particles, the conical torch comprising:
   a) a torch tube having a first end and a second end and having an internal surface comprising of a cylindrical section extending from the first end, and a conical section extending from an end of the cylindrical section to the second end with a final radius of $R_i$;
   b) an injector tube having an inner diameter to form a carrier flow path and a conical end with a cone shape outer surface having a cone angle α to form an annular gap with a gap size, d, with the conical section of the torch tube and to form an outer gas flow path for an outer gas, wherein the gap size is configured to accelerate the outer gas to cool the torch tube;
   c) a load coil to generate an inductively coupled plasma (ICP) having an induction zone, wherein an energy induced by the load coil forms a plasma in a torch cavity;
   d) a distal injector fixture and a proximal injector fixture configured to position the injector tube concentrically within the torch tube and within the load coil;
   e) wherein a flow rate of the outer gas is predetermined to generate a low-pressure region in front of the conical end of the injector tube to pull the plasma inside the conical torch, thereby increasing stability and a power density of the plasma, whereby sample particles are injected into the carrier flow path of the conical torch, and pass through the plasma to form molten particles and a spheroidization of the particles and finally generate solid, smooth, spherical and dense processed particles once cooled.

2. The conical torch of claim 1, further having a second cylindrical section extending from the second end of the torch tube.

3. The conical torch of claim 1, wherein the power density of the plasma is between 500-13000 W/cm$^3$.

4. The conical torch of claim 1, further having a collection chamber that is connected to the conical torch by a mounting plate to collect processed particles.

5. The conical torch of claim 1, wherein the cone angle ($\alpha$) is between 7.5°-17.5°.

6. The conical torch of claim 1, wherein the radius $R_i$ of the second cylindrical section is between 13-17 mm.

7. The conical torch of claim 1, wherein the gap size d is between 1-2.5 mm to minimize torch wall temperature and flow instabilities.

8. The conical torch of claim 1, wherein the outer gas is injected into the outer gas flow path either axially or tangentially with a swirl angle $\beta$ to form a swirling flow to spread the particles radially away from a central axis to travel closer to the induction zone, and thereby the particles are exposed to much higher temperatures and melt faster.

9. The conical torch of claim 8, wherein the swirl angle $\beta$ is between 0 to 45° to provide a balance wherein the sample particles experienced a radial spreading, which reduced thermal loading.

10. The conical torch of claim 1, wherein the injector tube has a fluid cooling, comprising an inner tube of injector, an intermediate tube of injector, an outer tube of injector, a proximal injector fixture, a cooling fluid inlet, and a cooling fluid outlet, and thereby the injector tube is internally cooled so that it can be inserted deep into the plasma without being thermally damaged, and thereby the sample particles can be injected directly inside the plasma, rather than behind it, for better productivity.

11. The conical torch of claim 1, wherein a plasma power is in the range of 5 kW to 250 kW.

12. The conical torch of claim 1, wherein the conical torch is a radio- or a microwave frequency inductively couple plasma with a frequency between 400 kHz to 100 MHz.

13. The conical torch of claim 1, wherein a pressure within the torch tube is between atmospheric pressure (1 bar) to a soft vacuum.

14. The conical torch of claim 1, wherein the outer gas flow rate is between 20-150 L/min for 45 kW power.

15. The conical torch of claim 1, wherein the gap size is determined to provide a gas velocity for the outer gas in the range of 10-100 m/s.

16. The conical torch of claim 1, wherein the plasma gas is energized by passing radio-frequency alternating current through the load coil.

17. The conical torch of claim 1, wherein the conical torch is made from any one of dielectric material or fused quartz.

18. A method of making processed particles, characterizes as solid, smooth, spherical and dense particles from unprocessed solid particles, characterized as irregularly shaped particles, comprising the steps of:
  a) generating a plasma by a conical inductively coupled plasma torch, having a torch tube that has a first end and a second end and an internal surface comprising of a cylindrical section extending from the first end, and a conical section extending from an end of the cylindrical section to the second end; the conical torch further has an injector tube having an inner diameter to form an inner gas flow path and a conical end with an outer surface having a cone angle $\alpha$ to form an annular gap with a gap size d, with the conical section of the torch tube to form an outer gas flow path, wherein the conical torch generates a plasma with high power density having a rapidly increasing temperature zone;
  b) injecting unprocessed solid particles into the inner gas flow path together with a carrier plasma gas, wherein the unprocessed solid particles are carried and injected into the plasma;
  c) rapidly melting unprocessed solid particles inside the plasma and generating spherical molten particles by capillary and surface tension forces of the molten particles, and
  d) cooling the spherical molten particles to form the solid, smooth, spherical and dense particles.

19. The method of claim 18, wherein injecting an outer gas into the outer gas flow path with a swirl to cause a radial spreading of the unprocessed solid particles cause them to enter a hotter region of the plasma, whereby generating a high percentage of the spherical solid particle while operating with a lower gas and energy consumption.

20. The method of claim 18, configured for generating at least 70% of the spherical solid particles over a total particles by mass.

21. A plasma spray method for turning a given material into a partially or fully molten drops and depositing them on a given substrate, comprising the steps of:
  a) generating an inductively coupled plasma discharge by means of a conical torch having a torch tube that has a first end and a second end and an internal surface comprising of a cylindrical section extending from the first end, and a conical section extending from an end of the cylindrical section to the second end; the conical torch further has an injector tube having an inner diameter to form an inner gas flow path and a conical end with an outer surface having a cone angle $\alpha$ to form an annular gap with a gap size, d, with the conical section of the torch tube to form an outer gas flow path wherein the conical torch generates a plasma with high power density having a rapidly increasing temperature zone;
  b) injecting the given material into the plasma discharge, by way of suspending the given material in particle form in a liquid carrier creating a suspension;
  c) evaporating the liquid carrier liquid and desolvating the suspension by means of said plasma discharge and agglomerating the given material particles into the partially or fully molten drops, or injecting the given material into the plasma discharge in the form of a powder, a rod, or a wire, and
  d) turning the injected powder, rod, or wire material into partially or fully molten drops by means of the plasma discharge,
  whereby a higher power density of the plasma discharge due to the conical geometry melts a greater portion of the injected material and leads to a denser, more uniform coating with improved mechanical properties.

22. The plasma spray method of claim 21, further comprising steps of accelerating said partially or fully molten drops by means of the plasma discharge and deposit them onto a given substrate to form a coating.

23. A powder production process by atomization and melting of a given material, comprising:
  a) generating an inductively coupled plasma discharge by means of a conical torch having a torch tube that has a first end and a second end and an internal surface comprising of a cylindrical section extending from the first end, and a conical section extending from an end of the cylindrical section to the second end; the conical torch further has an injector tube having an inner diameter to form an inner gas flow path and a conical end with an outer surface having a cone angle α to form an annular gap with a gap size, d, with the conical section of the torch tube to form an outer gas flow path wherein the conical torch generates a plasma with high power density having a rapidly increasing temperature zone;

b) feeding the given material in the form of wire, rod, raw powder, or suspension into the plasma discharge to be melted or evaporated by the heat generated by the plasma;

c) atomizing the molten material by the plasma discharge to form small droplets which then exit the second portion of the tubular component, followed by a process to cool down the droplets, solidify them into power particles, and d) collecting the cooled, solidified powder particles by a powder collector placed in front of the second portion of the tubular component, whereby a higher power density of the plasma discharge due to the conical geometry melts a greater portion of the injected material and leads to higher powder output, and whereby the higher power density of the plasma discharge allows for reduction of plasma power, without affecting the performance of the torch, to save electrical energy and reduce operation costs.

24. The powder production process of claim 23, wherein the material is a pure metal, a ceramic, an alloy, or a composite material.

25. The powder production process of claim 23, the conical torch is configured to form nano powders by first evaporating the unprocessed material which then nucleates homogenously to form nano powders and wherein a catalyst is injected to help with nucleation.

26. A powder spheroidization method, comprising:

a) generating an inductively coupled plasma discharge by means of a conical torch having a torch tube that has a first end and a second end and an internal surface comprising of a cylindrical section extending from the first end, and a conical section extending from an end of the cylindrical section to the second end; the conical torch further has an injector tube having an inner diameter to form an inner gas flow path and a conical end with an outer surface having a cone angle α to form an annular gap with a gap size d, with the conical section of the torch tube to form an outer gas flow path wherein the conical torch generates a plasma with high power density having a rapidly increasing temperature zone;

b) injecting powder of a given material having crushed, non-spherical, or non-uniform particles into the said plasma discharge to be at least partially molten or fully molten by the plasma discharge, wherein the molten particles then assuming a spherical shape due to surface tension forces, and c) cooling the said spherical molten particles to re-solidify and collecting the solidified particles, whereby a higher power density of the plasma discharge due to the conical geometry melts a greater portion of the injected material and leads to higher throughput, and whereby the higher power density of the plasma discharge allows for reduction of plasma power, without affecting the performance of the torch, to save electrical energy and reduce operation costs.

27. The powder spheroidization method of claim 26, wherein powder material is of a pure metal, alloy, ceramic, or a composite material.

28. The powder spheroidization method of claim 26, wherein the plasma power is in the range of 25-45 kW and the feed rate to the plasma discharge is in the range of 1-150 gram/min.

29. The conical torch of claim 1, wherein the power density of the plasma is between 1000-5000 W/cm$^3$.

30. The conical torch of claim 11, wherein the plasma power is in the range of 20-50 kW.

31. The conical torch of claim 12, wherein the conical torch is a radio- or a microwave frequency inductively couple plasma with a frequency between 3 MHz to 40 MHz.

* * * * *